United States Patent
Rastogi et al.

(10) Patent No.: US 11,798,071 B2
(45) Date of Patent: Oct. 24, 2023

(54) COMPUTER-BASED SYSTEMS WITH TOOLS DESIGNED FOR REAL-TIME RECONFIGURING A PLURALITY OF DISTINCT DATABASES AND METHODS OF USE THEREOF

(71) Applicant: Capital One Services, LLC, McLean, VA (US)

(72) Inventors: Vaibhav Rastogi, McLean, VA (US); Erik Virbitsky, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 451 days.

(21) Appl. No.: 16/849,919

(22) Filed: Apr. 15, 2020

(65) Prior Publication Data
US 2021/0326975 A1    Oct. 21, 2021

(51) Int. Cl.
G06Q 40/02    (2023.01)
G06Q 20/10    (2012.01)
H04L 9/40    (2022.01)

(52) U.S. Cl.
CPC .......... *G06Q 40/02* (2013.01); *G06Q 20/108* (2013.01); *H04L 63/083* (2013.01)

(58) Field of Classification Search
None
See application file for complete search history.

(56) References Cited

U.S. PATENT DOCUMENTS

| 7,392,940 | B2 * | 7/2008 | Hansen ................. G06Q 40/12 235/379 |
| 7,970,705 | B2 | 6/2011 | Patterson |
| 7,987,138 | B2 | 7/2011 | Patterson |
| 8,095,464 | B2 | 1/2012 | Patterson et al. |
| 8,311,943 | B2 | 11/2012 | Patterson |
| 9,830,648 | B2 | 11/2017 | Kanjia et al. |
| 9,934,494 | B1 | 4/2018 | Nolte et al. |

(Continued)

OTHER PUBLICATIONS

M. E. Peters, "Emerging ecommerce credit and debit card protocols," Proceedings. Third International Symposium on Electronic Commerce,, 2002, pp. 39-46, doi: 10.1109/ISEC.2002.1166909. (ECommerce) (Year: 2002).*

(Continued)

*Primary Examiner* — Chikaodinaka Ojiaku
(74) *Attorney, Agent, or Firm* — Greenberg Traurig, LLP

(57) ABSTRACT

Systems and methods associated with providing user interfaces and back-end processing features for transferring recurring charges from a first account to a second account are disclosed. In one embodiment, an exemplary method may comprise receiving a request from a user to transfer recurring charges from a first account to a second account, generating a first user interface that enables the user to provide account information comprised of a plurality of statements and/or account credentials associated with the first account, determining at least one recurring charge of the first account using the account information, generating a second user interface to display the at least one recurring charge and prompt the user to submit merchant-related credentials associated with the at least one recurring charge, transferring the merchant-related credentials, the at least one recurring charge from the first account to the second account.

12 Claims, 9 Drawing Sheets

(56) References Cited

U.S. PATENT DOCUMENTS

| | | | | |
|---|---|---|---|---|
| 9,965,808 | B1* | 5/2018 | Kunz | G06Q 40/12 |
| 10,523,681 | B1* | 12/2019 | Bulgakov | G06F 16/906 |
| 10,671,749 | B2* | 6/2020 | Felice-Steele | G06F 16/13 |
| 10,783,576 | B1* | 9/2020 | Van Os | G06Q 20/3278 |
| 10,915,227 | B1* | 2/2021 | Proud | G06F 9/451 |
| 10,937,090 | B1* | 3/2021 | DeBie | G06Q 40/03 |
| 10,963,972 | B1* | 3/2021 | Gambale | H04N 7/15 |
| 11,119,626 | B1* | 9/2021 | Duneja | G06Q 20/14 |
| 11,157,997 | B2* | 10/2021 | Robida | G06Q 40/08 |
| 11,159,593 | B1* | 10/2021 | Jacobs | G06Q 40/03 |
| 2003/0055780 | A1* | 3/2003 | Hansen | G06Q 30/02 |
| | | | | 705/39 |
| 2004/0088261 | A1* | 5/2004 | Moore | G06Q 20/382 |
| | | | | 705/64 |
| 2005/0129270 | A1* | 6/2005 | Prakash | G06T 1/0071 |
| | | | | 358/1.14 |
| 2006/0039580 | A1* | 2/2006 | Moon | G07D 7/12 |
| | | | | 382/137 |
| 2006/0116949 | A1* | 6/2006 | Wehunt | G06Q 40/02 |
| | | | | 705/35 |
| 2006/0235777 | A1* | 10/2006 | Takata | G06Q 40/00 |
| | | | | 705/35 |
| 2007/0033134 | A1* | 2/2007 | Carretta | G06Q 20/40 |
| | | | | 705/38 |
| 2007/0038561 | A1* | 2/2007 | Vancini | G06Q 20/108 |
| | | | | 705/39 |
| 2016/0103675 | A1* | 4/2016 | Aabye | G06F 9/4451 |
| | | | | 717/170 |
| 2016/0180302 | A1* | 6/2016 | Bagot, Jr. | G06Q 20/102 |
| | | | | 705/40 |
| 2017/0024743 | A1* | 1/2017 | Fogel | G06Q 20/227 |
| 2017/0091765 | A1* | 3/2017 | Lloyd | G06Q 20/321 |
| 2018/0101904 | A1 | 4/2018 | Kanjla et al. | |
| 2018/0174145 | A1* | 6/2018 | Groarke | G06Q 20/4016 |
| 2018/0191685 | A1* | 7/2018 | Bajoria | H04L 51/224 |
| 2019/0035032 | A1 | 1/2019 | Hossein et al. | |
| 2019/0205871 | A1* | 7/2019 | Vernon | G06Q 20/405 |
| 2020/0118132 | A1* | 4/2020 | Schmidt | G06Q 20/4016 |
| 2020/0118133 | A1* | 4/2020 | Schmidt | G06Q 20/102 |
| 2020/0202316 | A1* | 6/2020 | Hu | G06Q 20/10 |
| 2020/0257561 | A1* | 8/2020 | Ortiz | G06F 9/451 |
| 2020/0358664 | A1* | 11/2020 | King | G06N 20/00 |
| 2020/0372572 | A1* | 11/2020 | Frohwein | G06Q 40/03 |
| 2021/0042723 | A1* | 2/2021 | Walters | G06Q 20/102 |
| 2021/0110363 | A1* | 4/2021 | Jones | G06Q 20/3223 |
| 2021/0136014 | A1* | 5/2021 | Hart | H04L 51/56 |
| 2021/0141517 | A1* | 5/2021 | Camargo | H04L 67/535 |
| 2021/0158253 | A1* | 5/2021 | Dolan | G06Q 20/102 |
| 2021/0209570 | A1* | 7/2021 | England | G06Q 20/10 |
| 2021/0350340 | A1* | 11/2021 | Lai | G06Q 40/02 |
| 2022/0092596 | A1* | 3/2022 | Goodrich | G06Q 20/42 |

OTHER PUBLICATIONS

Umakant Mishra, Inventions on Drag and Drop in GUI (Sep. 7, 2007). Available at SSRN:http://ssrn.com/abstract=1264691 or http://dx.doi.org/10.2139/ssrn.1264691 (Drag and Drop) (Year: 2007).*

* cited by examiner

US 11,798,071 B2

COMPUTER-BASED SYSTEMS WITH TOOLS DESIGNED FOR REAL-TIME RECONFIGURING A PLURALITY OF DISTINCT DATABASES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems with tools designed for real-time reconfiguring a plurality of distinct databases and methods of use thereof.

BACKGROUND OF TECHNOLOGY

A computer network platform or system may include a group of computers (e.g., clients, servers, smart routers, etc.) and other computing hardware devices that are linked together through one or more communication channels to facilitate communication, account management and/or electronic handling.

SUMMARY OF DESCRIBED SUBJECT MATTER

In some embodiments, the present disclosure provides various exemplary technically improved computer-implemented methods for transferring recurring charges from a first account to a second account, including a method having steps such as:

receiving, by at least one computing processor, a request from a user to transfer recurring charges from a first account of a first financial institution to a second account of a second financial institution;

generating, by the at least one computing processor, a first user interface that enables the user to provide account information associated with first account, wherein the account information comprises (i) a plurality of statements associated with the first account, (ii) account credentials associated with the first account, or both (i) and (ii);

determining, by the at least one computing processor and using the account information, at least one recurring charge of the first account;

generating, by the at least one computing processor, a second user interface that is configured to:
  (i) display to the user the at least one recurring charge, and
  (ii) prompt the user to submit merchant-related credentials associated with the at least one recurring charge; and transferring, by the at least one computing processor and using the merchant-related credentials, the at least one recurring charge from the first account to the second account.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Systems and methods associated with providing user interfaces and computerized processing features for transferring recurring charges from a first account to a second account are disclosed. In one embodiment, an exemplary method may comprise receiving a request from a user to transfer recurring charges from a first account to a second account, generating a first user interface that enables the user to provide account information comprised of a plurality of statements and/or account credentials associated with the first account, determining at least one recurring charge of the first account using the account information, generating a second user interface to display the at least one recurring charge and prompt the user to submit merchant-related credentials associated with the at least one recurring charge, transferring the merchant-related credentials, and the at least one recurring charge from the first account to the second account.

Figure 1:
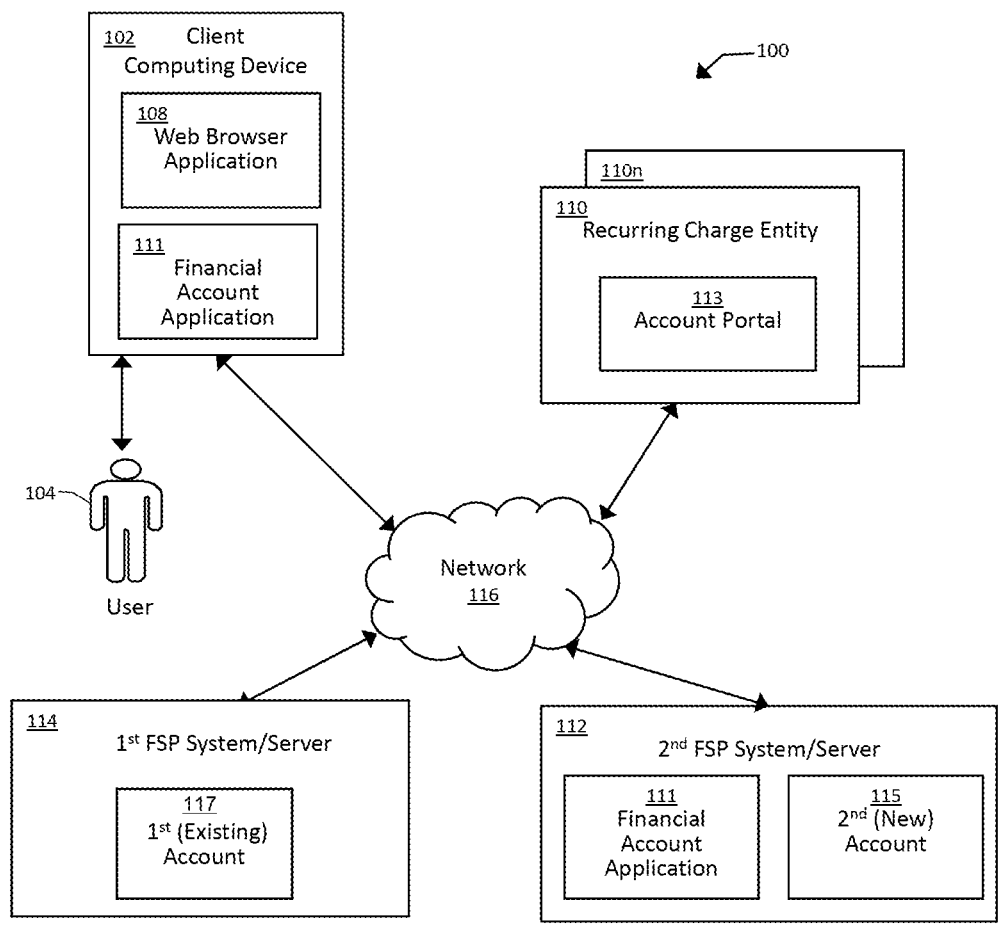
FIG. 1 is a block diagram of an exemplary system and/or platform involving features of transferring recurring charges, consistent with exemplary aspects of certain embodiments of the present disclosure.

FIG. 1 is a block diagram of an exemplary system and/or platform 100 involving features of transferring recurring charges as well as generating associated user interfaces, in accordance with at least some disclosed embodiments. System 100 may be configured for executing one or more software applications, including a financial account application involving a portal having user interfaces configured for transferring recurring charges (hereafter "financial account application") and/or a web browser application, consistent with disclosed embodiments. As shown, system 100 may include a computing device 102, such as a client computing device, associated with a user 104. Computing device 102 may be configured to execute, among other programs, a web browser application 108 and a financial account application 111 associated with a financial service provider. System 100 may further include one or more third-party computers or systems such as those associated with an entity (referred to herein as both a "recurring charge entity" 110 and a "merchant") involved with providing one or more products, such as goods or services, to the user 104 and generating recurring charges to a user account in exchange for such goods, services, or the like. The recurring charge entity 110 may operate an account portal 113 for customers that enables the user 104 to login and manage the user account, including making changes to a payment method (e.g., a user's bank or credit account) to which the recurring charges are remitted. System may also include a first financial services provider ("FSP") system or server 114 having a first (existing) account 117 of the user that is subject to a recurring charge from the recurring charge entity 110, as well as a second financial services provider (FSP) system or server 112 having a second (new) account 115 to which the recurring charges are to be transferred. The second FSP system or server 112 may also provide the financial account application 111 that is provided to the user and includes features and functionality for transferring the recurring charges from the first account 117 to the second account 115. As shown, client computing device 102, recurring charge entity 110, first FSP system 114, second FSP system 112 may be communicatively coupled by a network 116. Various features, functionality and benefits of financial account application 111 may also be achieved via a financial account applications or subcomponents 111 within or executed by the client computing device 102. For simplicity of explanation, the behavior of the financial account application 111 is discussed generally, below, without referring to or differentiating its performance on the client computing device 102 versus the second FSP system 112.

While only the computing device 102, application 108 and 111, entity 110, FSP system 112 and 114, account portal 113, and network 116 shown in FIG. 1 are discussed herein, it will be understood that system 100 may include additional ones of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing the financial account application 111 and/or the web browser application 108. One illustrative computing device 102 is further described below in connection with FIG. 3.

Web browser application 108 may be one or more software applications configured to perform operations consistent with providing web or network pages to the user, accessing the financial account application 111 (such as via a portal), as set forth herein, as well as interacting with the financial account application 111, and the like. Here, for example, web browser application 108 may be configured to provide various information, associated with accessing user interfaces and/or pages related to the user's 104 activity with the second FSP system 112. Such processing may occur by or with a web browser application 108, locally on the client computing device 102, or the web browser application 108 may transmit requests to and/or operate with one or more other software applications and/or computing components to process the desired information. Web browser application 108 may also be hosted and/or operated, in whole or in part, by a web browser system and/or server, such as the example system described below in connection with FIG. 2. Web browser application 108 is further described below in connection with FIG. 3.

In general, first FSP system 114 and second FSP system 112 may each be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art. These FSP systems 112 and 114 may be one or more computing devices configured to perform operations consistent with servicing or maintaining financial service accounts, including a financial service account associated with user 104. FSP systems 112 and 114 may be further configured to manage existing accounts, generate new accounts, and process financial transactions associated with such financial service accounts. In some embodiments, second FSP system 112 may be further configured to generate a portal and associated user interfaces for a display device included in, or connected to, computing device 102, e.g. via financial account application 111, which may be a desktop or mobile banking or other such application, on computing device 102. Alternatively or additionally, second FSP system 112 may be configured to provide such account management functionality through one or more online portals and/or user interfaces that are accessible by computing device 102 over network 116. The disclosed embodiments are not limited to any particular configuration of second FSP system 112.

Financial account application 111 may be one or more software applications, modules, routines, subroutines and/or extensions configured to perform operations consistent with accessing, using and/or managing information related to the user's interactions with the second FSP system 112, such as a portal that provides user interfaces as well as other features and functionality associated with the user's management of their accounts with the second FSP system 112.

Recurring charge entity 110 may be an entity associated with one or more computing devices that are being operated in connection with providing one or more goods or services to the user. The recurring charge entities, in turn, issues recurring charges to a first account 117 of a user, which the user may wish to be transferred to a second account 115 in accordance with embodiments here. Recurring charge entity 110 may also provide an account portal for the user and other customer, by which such individuals may manage their subscriptions or other accounts that are the genesis of the recurring charges.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
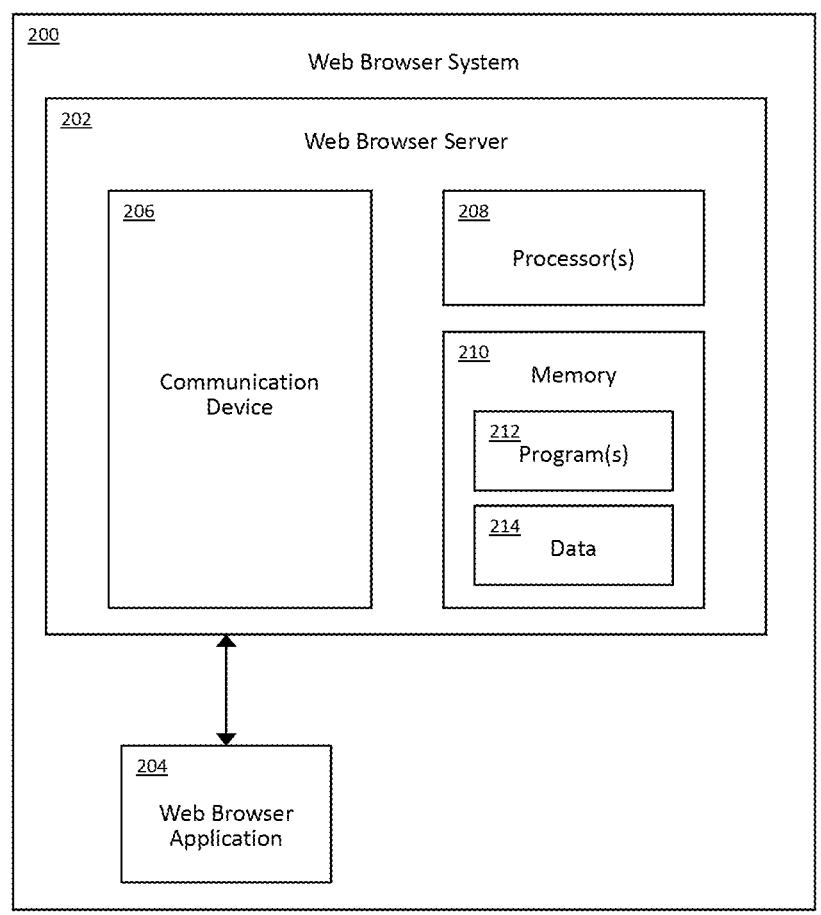
FIG. 2 is a block diagram of an exemplary system and/or platform involving features of transferring recurring charges, consistent with exemplary aspects of certain embodiments of the present disclosure.

FIG. 2 is a block diagram of an exemplary web browser system 200, consistent with disclosed embodiments. As shown, web browser system 200 may include web browser server 202 and web browser application 204. Web browser server 202 may include a communication device 206, one or more processor(s) 208, and memory 210 including one or more programs 212 and data 214. Web browser server 202 may be configured to perform operations consistent with providing web browser application 204.

Web browser server 202 may take the form of a server, general purpose computer, mainframe computer, or any combination of these components. Other implementations consistent with disclosed embodiments are possible as well. Web browser application 204 may take the form of one or more software applications stored on a computing device, such as web browser application 108 stored on computing device 102 described above.

Communication device 206 may be configured to communicate with one or more computing devices, such as computing device 102. In some embodiments, communication device 206 may be configured to communicate with the computing device(s) through web browser application 204. Web browser server 202 may, for example, be configured to provide instructions and/or operating information to web browser application 204 through communication device 206. Communication device 206 may be configured to communicate other information as well.

Communication device 206 may be further configured to communicate with one or more FSP systems, such as first FSP system 114 and second FSP system 112 described above, and/or with other entities, such as recurring charge entity 110 described above. In some embodiments, such FSP systems 112, 114 may provide a financial service account associated with a computing device, and communication device 206 may be configured to communicate with the FSP system(s) to generate, transmit and/or process account-related information or instructions regarding the financial service account associated with the computing device. Communication device 206 may be configured to communicate with the FSP system(s) in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of web browser system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include web browsing activities as well as creation and/or management of user accounts managed over the world wide web, such as financial accounts with FSP systems 112,114. The disclosed embodiments are not limited to separate programs or computers configured to perform dedicated tasks. For example, memory 210 may include a single program 212 that performs the functions of web browser system 200, or program(s) 212 may comprise multiple programs. Memory 210 may also store data 214 that is used by program(s) 212.

In certain embodiments, memory 210 may store one or more sets of instructions involved with carrying out the processes described herein, such as those set forth in connection with FIGS. 4 and 5. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by web browser application 204 in performing creation and/or management activities associated with online accounts.

The components of web browser system 200 may be implemented in hardware, software, or a combination of both hardware and software, as will be apparent to those skilled in the art. For example, although one or more components of web browser system 200 may be implemented as computer processing instructions, all or a portion of the functionality of web browser system 200 may be implemented instead in dedicated electronics hardware. In some embodiments, web browser system 200 may also be communicatively connected to one or more database(s) (not shown). Alternatively, such database(s) may be located remotely from web browser system 200. Web browser system 200 may be communicatively connected to such database(s) through a network, such as network 116 described above. Such database(s) may include one or more memory devices that store information and are accessed and/or managed through web browser system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
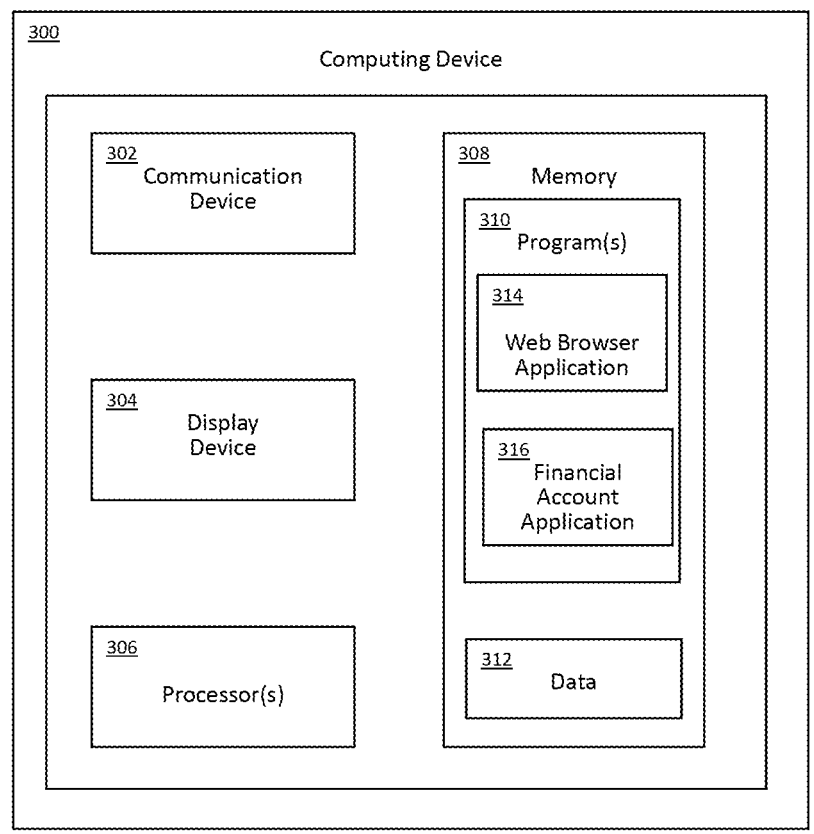
FIG. 3 is a block diagram of an exemplary computing device that may be associated with transferring recurring charges, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, web browser application 314 and financial account application 316. In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a user's person. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed elsewhere herein. In some embodiments, communication device 302 may be further configured to communicate with one or more other entities including FSP systems, such as FSP systems 112, 114 described above, and recurring charge entity 110 also described above. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 314. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out various processes, such as those performed in connection with FIGS. 4 and 5. Other instructions are possible as well. In general, instructions may be executed by processor(s) 306 to perform one or more processes consistent with disclosed embodiments.

In some embodiments, program(s) 310 may include a web browser application 314. Web browser application 314 may be executable by processor(s) 306 to perform operations including, for example, providing web pages, including login pages requiring user credentials, for display, and/or managing user's online accounts. Such web pages may be provided, for example, via display device 304. In some embodiments, the web pages may be associated with systems, such as FSP systems 112 and 114, recurring charge entity 110, and the like, described above. Web browser application 314 may be executable by processor(s) 306 to perform other operations as well. In some embodiments, program(s) 310 may further include a financial account application 316. Financial account application 316 may, for example, be the same as similar to financial account application 111 of client computing device 102 described above. Financial account application 316 may be executable by processor(s) 306 to perform various operations including, for example, creating and/or managing financial accounts of the user by computing device 300 via web browser application 314. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
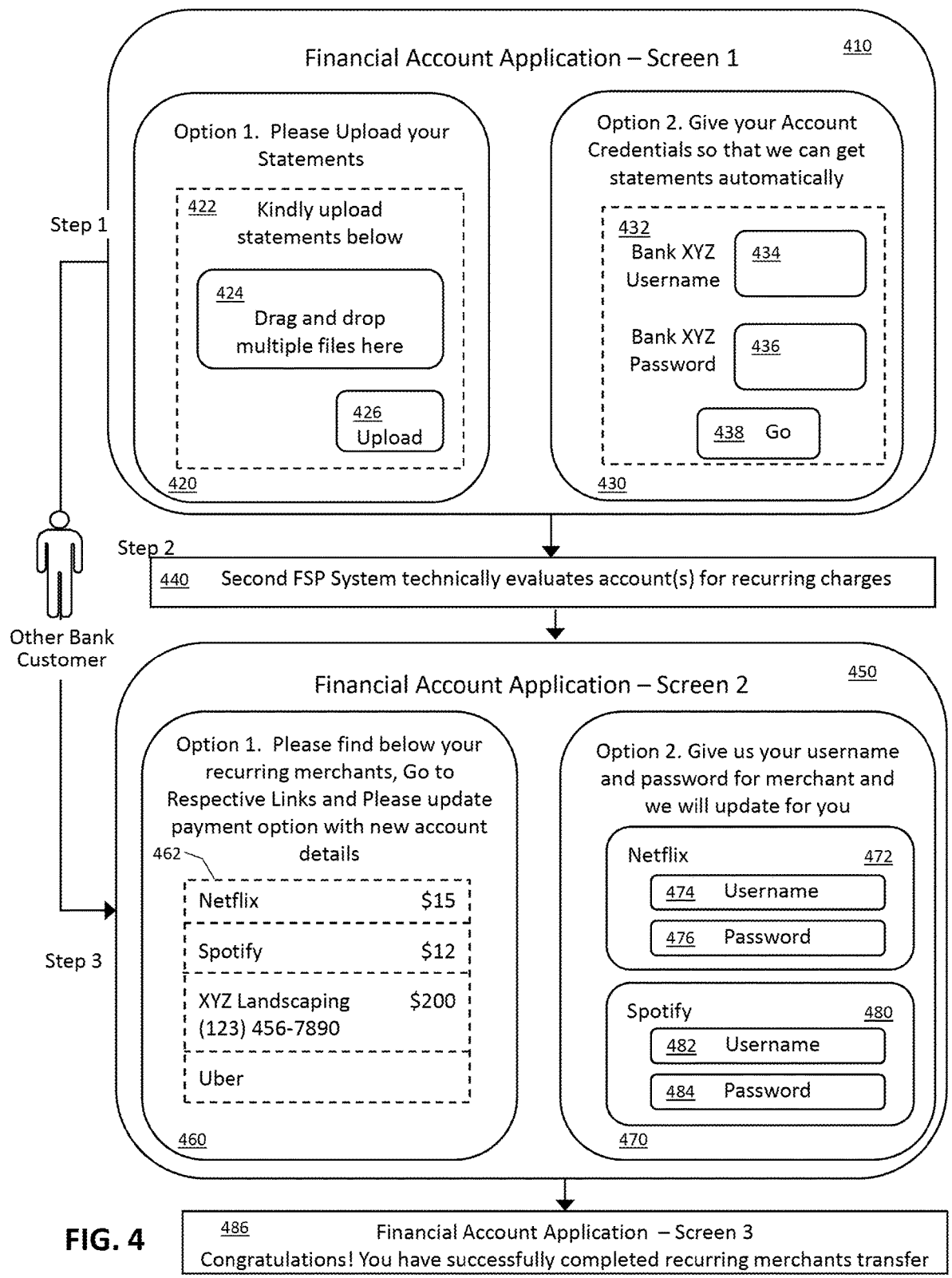
FIG. 4 is diagram illustrating an exemplary sequence of user interfaces and associated computer processing steps, consistent with exemplary aspects of certain embodiments of the present disclosure.

FIG. 4 is diagram illustrating an exemplary sequence of user interfaces and associated computer processing steps, consistent with exemplary aspects of certain embodiments of the present disclosure. FIG. 4 depicts an illustrative sequence of three screens and four steps associated with an exemplary process of transferring recurring charges from a first account to a second account. The exemplary sequence of FIG. 4 begins with a first step (Step 1) that includes displaying a first user interface 410, e.g. Screen 1, upon receipt of the user's authorization to begin transferring one or more recurring charges from a first account to a second account. In some embodiments, the user may be a customer of another bank or financial institution, such as first FSP system 114, and the user interfaces may be provided via a second bank or financial institution, such as second FSP system 112, which provides the user interfaces and functionality as part of procuring new customers from other financial institutions. Here, for example, the second FSP system 112 may incentivize the user to migrate an account, such as a credit card account with a balance and recurring charges, by generating a new account having more favorable terms than the user's existing account.

Turning back to FIG. 4, the first user interface 410 may be generated with one or both of a first input portal 422 and/or a second input portal 432, by which the user may provide the information that is needed for the second FSP system to identify any charges associated with accounts being transferred that are recurring charges. In some embodiments, a first input portal 422 may be provided to allow the user to upload bank or account statements to be analyzed on the back-end (e.g., by the second FSP system 112) to identify recurring charges. Here, for example, the first input portal 422 may comprise a first interactive field 424 that enables the user to drag and drop files corresponding to statements that the user would like to be analyzed for possible recurring charges. Other UI tools may be provided to identify or attach files or statements associated with the user's account, such as a file search or navigation tool that allows the user to browse through folders and select files. Further, the first input portal 422 may also include one or more buttons or UI elements 426 which may be selected, after the file(s) are identified, to process, upload and/or submit the files (i.e., the user's account statements) identified.

In some embodiments, a second input portal 430 may also, or alternatively, be provided to the user to help identify potential recurring charges for transfer from the first account to the second account. Here, for example, a second input portal 430 may be generated to request and obtain account credentials that enable the second FSP system 112 to access the accounts that the user identified and identify any recurring charges being debited to such accounts. As shown in the example user interface 410 of FIG. 4, the account credentials received by the second input portal 432 may include a first field 434 to receive the user's username for the account subject to transfer as well as a second field 436 to receive the user's password for that account. The second input portal 432 may also include a UI element 438 that instructs the second FSP system 112 to proceed accessing the user account. Other variations of the functionality illustrated may also be utilized to provide the second FSP system with sufficient access to the user's account(s) to identifying recurring charges.

Once the information needed to identify recurring charges has been obtain, via the first user interface 410 for example, the exemplary sequence of FIG. 4 may proceed to the second step, at 440. In the second step 440, the second FSP system 112 receives the account information obtain via the first user interface 410 and performs automated computerized processing to determine and identify the recurring charges being debited to the account(s) that the user has identified for transfer as well as the merchants (i.e., recurring charge entities 110) associated with each recurring charge. Such automated processing is performed by computing components of the second FSP system 112, such as by backend components of the second FSP system 112. In some embodiments, the automated processing that the second FSP system 112 performs to identify the recurring charges may comprise, for example, machine learning techniques involving Naive Bayes classification techniques and/or algorithms for determination of recurrence relationships. Further, in some embodiments, the machine learning model utilized by second FSP system 112 may be trained using supervised learning on sample data, e.g. available to one or more financial services entities that are associated with the second FSP system 112, to increase and maintain accuracy.

Once the recurring charges and associated merchants have been identified in the second step 440, the exemplary sequence may proceed to the third step, at 450. In the third step, the second FSP system 112 may generate a second user interface 450 that is configured to display the recurring charges, via a first display field 460, and prompt the user, at 470, to submit merchant-related credentials of merchants associated with the recurring charges displayed in the first display field 460. The second user interface 450 may comprise a first display field 460 that includes a listing 462 of the recurring charges and/or associated merchants identified in the second step 440. The dates that the recurring charges occurred may also be included in the listing 462. The recurring charges provided in the listing 462 may also include embedded links that enable the user to click a link to immediately navigate to a login page of the merchant associated with that recurring charge, e.g., to facilitate updating the account information to which the respective recurring charges are debited. In another embodiment, the user may be redirected to a separate online tool or portal having user interfaces and/or interactive UI elements that enable the user to update bank or payment information of merchant accounts associated with the recurring charges that are being transferred to the second FSP system 112.

The second user interface 450 may further comprise a second display field 470 that includes one or more entry fields 472, 480, such as one entry field for each of the merchants identified as having recurring charges to the user account being transferred. The entry fields 472, 480 may be configured to prompt the user to submit merchant-related credentials to access the accounts of the merchants identified as having recurring charges to the user. In some embodiments, the entry fields 472, 480 may comprise a username field 474, 482 and a password field 476, 484, by which the user is prompted to enter merchant-related login credentials. Here, for example, these merchant-related login credentials may be the credentials needed to login to and manage the user accounts that the user has with the merchants behind the recurring charges identified. With these merchant-related credentials received, the second FSP system 112 may perform automated processing to navigate to the merchant web sites, login to the user's account, and update the payment information for the recurring charge to the second account 115 at the second FSP system 112. In other embodiments, the second FSP system 112 may directly access one or more API (application programming interfaces) associated with the merchant to update the recurring charge to the new account.

Figure 5:
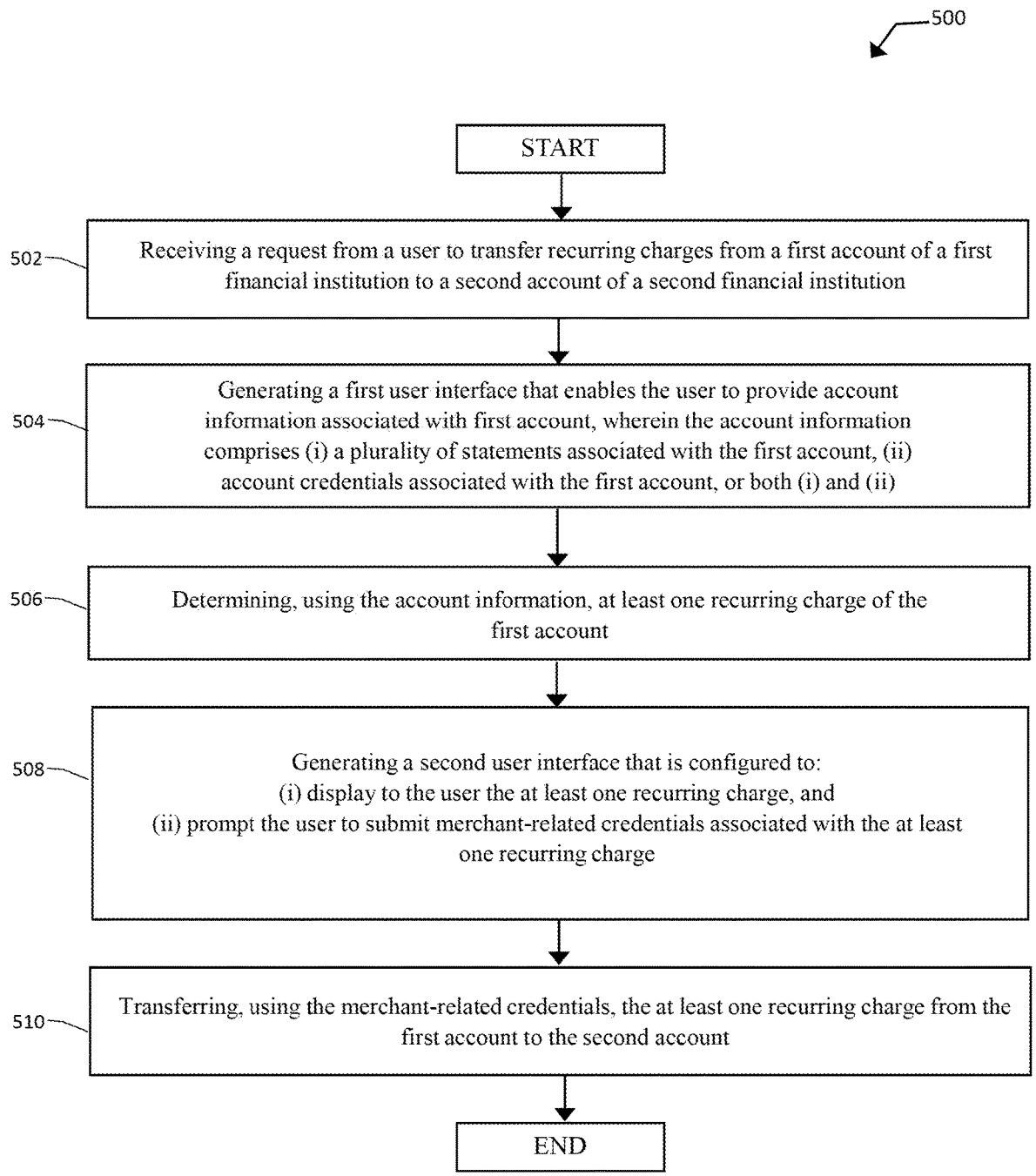
FIG. 5 is a flowchart illustrating one exemplary process related to transferring recurring charges, consistent with exemplary aspects of certain embodiments of the present disclosure.

FIG. 5 is a flowchart illustrating one exemplary method 500 related to provision of a portal for users to transfer recurring charges between customer accounts, consistent with exemplary aspects of at least some embodiments of the present disclosure. As shown in the exemplary flowchart of FIG. 5, one method of transferring recurring charges 500 may comprise: receiving a request from a user to transfer recurring charges from a first account of a first financial institution to a second account of a second financial institution, at 502; generating a first user interface that enables the user to provide account information associated with first account, wherein the account information comprises (i) a plurality of statements associated with the first account, (ii) account credentials associated with the first account, or both, at 504; determining, using the account information, at least one recurring charge of the first account, at 506; generating a second user interface that is configured to: (i) display to the user the at least one recurring charge, and (ii) prompt the user to submit merchant-related credentials associated with the at least one recurring charge, at 508; and transferring, using the merchant-related credentials, the at least one recurring charge from the first account to the second account. The merchant-related credentials may be, for example, a username and a password associated with an online account of a merchant or recurring charge entity 110 that provides goods or services to a customer in connection with issuing recurring charges to an associated customer. In some embodiments, the account credentials associated with the first account, in step 510, may comprise a username and password for the first account 117 of the first FSP system 114.

As explained above in connection with FIG. 4, in some embodiments, the step of determining the at least one recurring charge 506 may include determining such recurring charge(s) based on the user's submission plurality of statements, such as statements provided via first interactive field 422 in FIG. 4. Further, the step of determining the at least one recurring charge 506 may also include accessing information, e.g. based on information entered via a second interactive field 432 in FIG. 4, about a plurality of charges of the first account using the account credentials 434, 436, and determining the at least one recurring charge based on the information about the plurality of charges.

Once recurring charges have been identified, various features may be utilized to transfer such recurring charges or debits from the first account to the second account. According to certain embodiments, for example, transferring the at least one recurring charge from the first account to the second account 510 may comprise instructing, using the merchant-related credentials (e.g., 474/476, 482/484, or the like), a merchant associated with the at least one recurring charge to charge all future recurring charges to the second account. As explained above, such merchant-related credentials associated with such recurring charge may comprise a username 474/482 and a password 476/484 for a merchant account associated with a recurring charge to be transferred. Further, in some implementations, the step of transferring the at least one recurring charge from the first account to the second account 510 may comprise directly accessing, e.g. by a computer associated with the second financial institution using the merchant-related credentials (e.g., 474/476, 482/484, etc.), an account of a merchant associated with a recurring charge identified for transfer, and instructing the merchant account to debit all of the future recurring charge to the second account.

The financial account application 111 may provide other features and functionality in connection with transferring the recurring charge to the second account. According to certain embodiments, for example, the financial account application 111 may approve the user to transfer a balance from the first account 117 to the second account 115, while additionally providing the user interfaces and functionality herein to also transfer the recurring charges associated with the first account to the second account.

In some embodiments, the financial account application 111 may also generate and display various other user interfaces and/or graphical indicia that provide additional features and benefits to the user. For example, the financial account application 111 may provide a listing of recurring charges transferred from the first account to the second account, e.g., for display on a display device of the user to facilitate the user's comprehension and management of the recurring charges being transferred. Similarly, the financial account application 111 may display text or graphical indicia, such as another user interface or UI element, that communicates a transfer status of a recurring charge or a listing of recurring charges to the user, e.g., to indicate that transfers are in process, completed, or the like.

Figure 6:
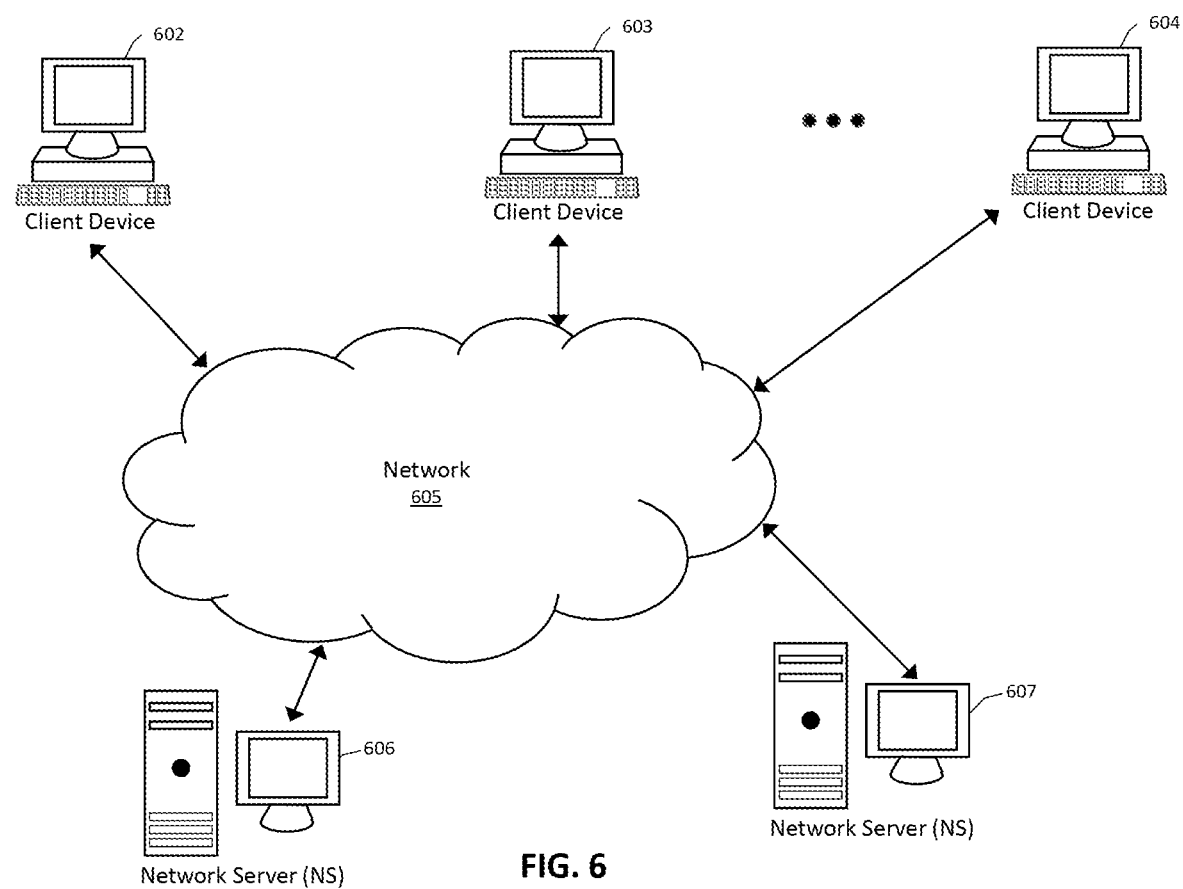
FIG. 6 is a block diagram depicting an exemplary computer-based system and/or platform, in accordance with certain embodiments of the present disclosure.

FIG. 6 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of users (e.g., clients, and their users) and/or concurrent interactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system/platform may include virtually any computing device capable of receiving and sending a message over a network (e.g., organization intranet, cloud network, etc.), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed network/web browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer- or machine-readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 1, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
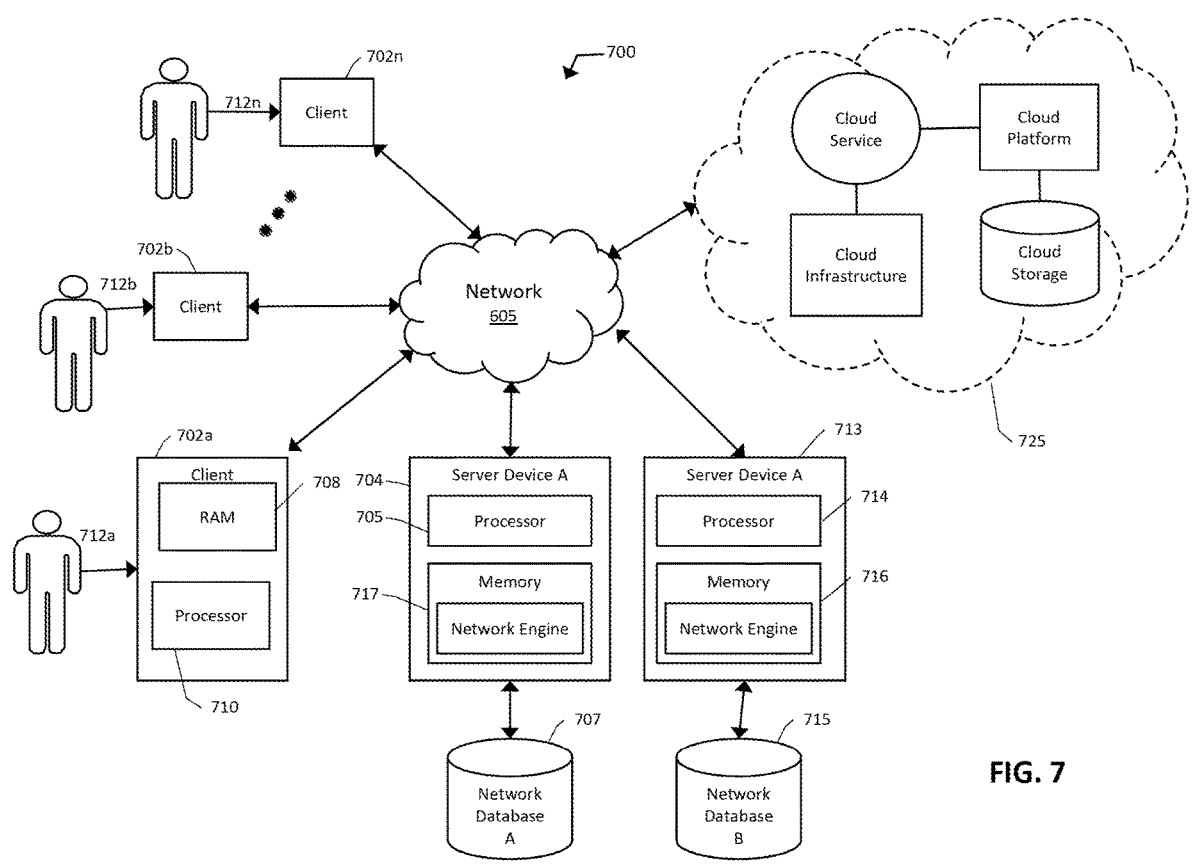
FIG. 7 is a block diagram depicting another exemplary computer-based system and/or platform, in accordance with certain embodiments of the present disclosure.

FIG. 7 depicts a block diagram of another exemplary computer-based system/platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a thru 702n may also comprise a number of external or internal devices such as a mouse, a CD-ROM, DVD, a physical or virtual keyboard, a display, a speaker, or other input or output devices. In some embodiments, examples of member computing devices 702a thru 702n (e.g., clients) may be any type of processor-based platforms that are connected to a network 605 such as, without limitation, personal computers, digital assistants, personal digital assistants, smart phones, pagers, digital tablets, laptop computers, Internet appliances, and other processor-based devices. In some embodiments, member computing devices 702a thru 702n may be specifically programmed with one or more application programs in accordance with one or more principles/methodologies detailed herein. In some embodiments, member computing devices 702a thru 702n may operate on any operating system capable of supporting a browser or browser-enabled application, such as Microsoft™ Windows™, and/or Linux. In some embodiments, member computing devices 702a thru 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a thru 702n, users 712a thru 712n, may communicate over the exemplary network 605 with each other and/or with other systems and/or devices coupled to the network 605. As shown in FIG. 7, exemplary server devices 704 and 713 may be also coupled to the network 605. In some embodiments, one or more member computing devices 702a thru 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
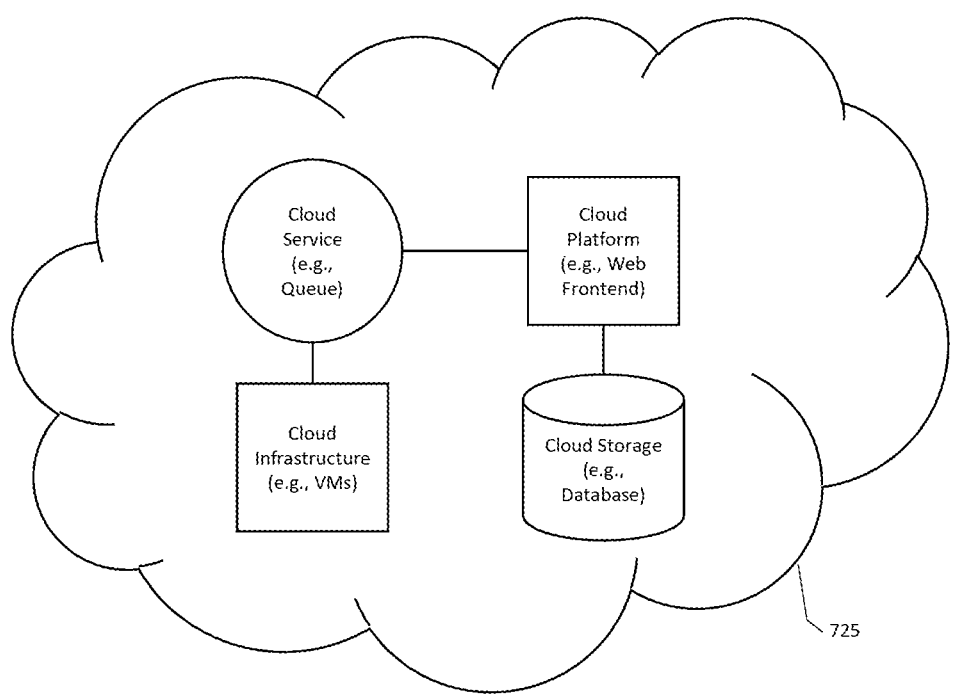
FIGS. 8 and 9 are diagrams illustrating two exemplary implementations of cloud computing architecture/aspects with respect to which the disclosed technology may be specifically configured to operate, in accordance with certain embodiments of the present disclosure.

As also shown in FIGS. 7 and 8, some embodiments of the disclosed technology may also include and/or involve one or more cloud components 725, which are shown grouped together in the drawing for sake of illustration, though may be distributed in various ways as known in the art. Cloud components 725 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 9:
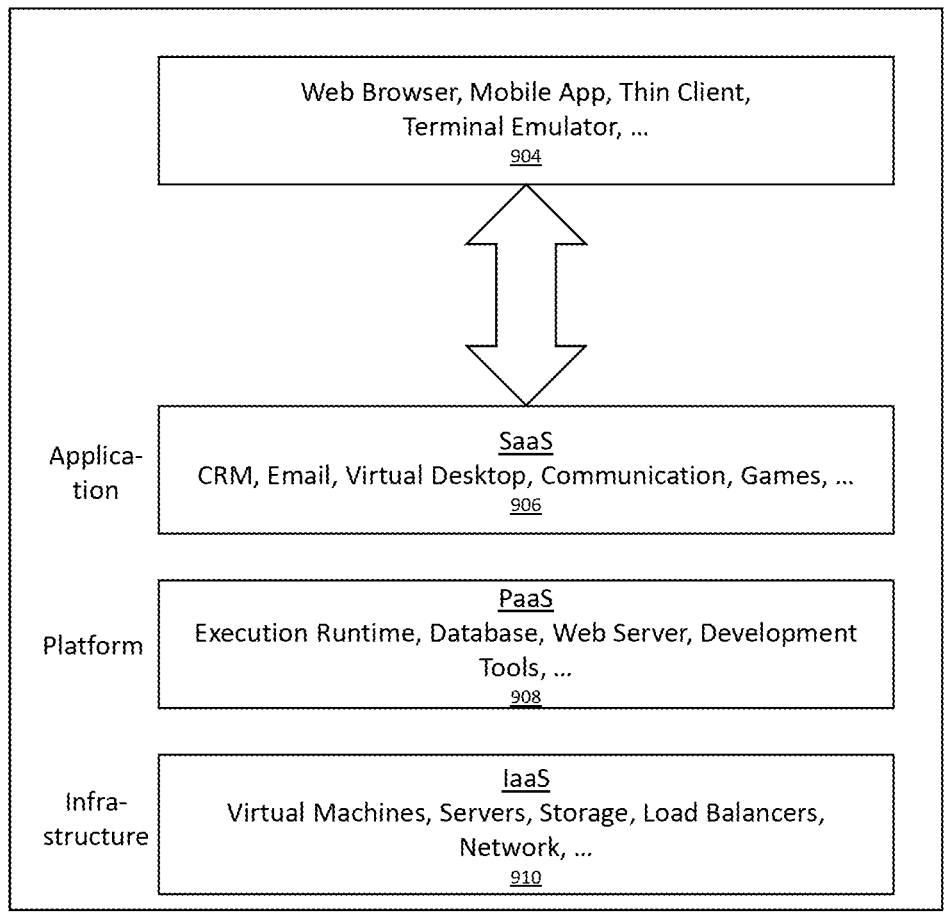

According to some embodiments shown by way of one example in FIG. 9, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 910, platform as a service (PaaS) 908, and/or software as a service (SaaS) 906. FIGS. 8 and 9 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 906, 908, 910 may be utilized in connection with the web browser and network aspects, shown at 904, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart television, etc.), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 8-9) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37)

Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, any implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, a virtually generated display, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, wearable or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  receiving, by at least one computing processor, a request from a user to transfer recurring charges from a first account of a first financial institution to a second account of a second financial institution;
  generating, by the at least one computing processor, a first user interface that enables the user to provide account information associated with first account, wherein the account information comprises (i) a plurality of statements associated with the first account, (ii) account credentials associated with the first account, or both (i) and (ii);

determining, by the at least one computing processor and using the account information, at least one recurring charge of the first account;

generating, by the at least one computing processor, a second user interface that is configured to:

(i) display to the user the at least one recurring charge, and (ii) prompt the user to submit merchant-related credentials associated with the at least one recurring charge; and transferring, by the at least one computing processor and using the merchant-related credentials, the at least one recurring charge from the first account to the second account.

Clause 2. The method of clause 1 or any embodiment of the present disclosure, wherein determining the at least one recurring charge is based on the plurality of statements.

Clause 3. The method of clause 1 or any embodiment of the present disclosure, wherein determining the at least one recurring charge includes accessing, by the at least one computing processor, information about a plurality of charges of the first account using the account credentials, and determining the at least one recurring charge based on the information about the plurality of charges.

Clause 4. The method of clause 1 or any embodiment of the present disclosure, wherein transferring the at least one recurring charge from the first account to the second account comprises:

instructing, by the at least one computing processor and using the merchant-related credentials, a merchant associated with the at least one recurring charge to charge in the future the at least one recurring charge to the second account.

Clause 5. The method of clause 1 or any embodiment of the present disclosure, wherein transferring the at least one recurring charge from the first account to the second account comprises:

accessing, by the at least one computing processor, an account of a merchant associated with the at least one recurring charge using the merchant-related credentials, and instructing the merchant to charge in the future the at least one recurring charge to the second account.

Clause 6. The method of clause 1 or any embodiment of the present disclosure, wherein the account credentials associated with the first account include a username and password for the first account.

Clause 7. The method of clause 1 or any embodiment of the present disclosure, wherein the merchant-related credentials associated with the at least one recurring charge include a username and password for an account of a merchant associated with the at least one recurring charge.

Clause 8. The method of clause 1 or any embodiment of the present disclosure, further comprising: displaying, by the at least one computing processor, a transfer status of the at least one recurring charge.

Clause 9. The method of clause 1 or any embodiment of the present disclosure, further comprising:

providing, by the at least one computing processor, a listing of recurring charges transferred from the first account to the second account.

Clause 10. The method of clause 1 or any embodiment of the present disclosure, further comprising:

transferring, by the at least one computing processor, a balance from the first account to the second account.

Clause 11. A computer-implemented method comprising:

receiving, by at least one computing processor, a request from a user to transfer a balance from a first account of a first financial institution to a second account of a second financial institution;

generating, by the at least one computing processor, a first user interface that enables the user to provide account information associated with first account, wherein the account information comprises (i) a plurality of statements associated with the first account, (ii) account credentials associated with the first account, or both (i) and (ii);

determining, by the at least one computing processor and using the account information, at least one recurring transaction of the first account;

generating, by the at least one computing processor, a second user interface that (a) enables the user to submit merchant-related credentials associated with the at least one recurring transaction, (b) provides a link to a landing page associated with the at least one recurring transaction, or both (a) and (b); and wherein the method further comprises:

transferring, by the at least one computing processor and using the merchant-related credentials, the at least one recurring transaction from the first account to the second account, or redirecting, by the at least one computing processor, the user to the landing page at which the user can login to transfer the at least one recurring transaction from the first account to the second account.

Clause 12. The method of clause 11 or any embodiment of the present disclosure, wherein determining the at least one recurring transaction is based on the plurality of statements.

Clause 13. The method of clause 11 or any embodiment of the present disclosure, wherein determining the at least one recurring transaction includes accessing, by the at least one computing processor, information about a plurality of transactions of the first account using the account credentials, and determining the at least one recurring transaction based on the information about the plurality of transactions.

Clause 14. The method of clause 11 or any embodiment of the present disclosure, wherein transferring the at least one recurring transaction from the first account to the second account comprises:

accessing, by the at least one computing processor, an account of a merchant associated with the at least one recurring transaction using the merchant-related credentials, and instructing the merchant to use in the future the second account for the recurring transaction.

Clause 15. The method of clause 11 or any embodiment of the present disclosure, wherein the account credentials associated with the first account include a username and password for the first account.

Clause 16. The method of clause 1 or any embodiment of the present disclosure, wherein the merchant-related credentials associated with the at least one recurring transaction include a username and password for an account of a merchant associated with the at least one recurring transaction.

Clause 17. The method of clause 11 or any embodiment of the present disclosure, further comprising:

displaying, by the at least one computing processor, a transfer status of the at least one recurring transaction.

Clause 18. The method of clause 11 or any embodiment of the present disclosure, further comprising:

providing, by the at least one computing processor, a listing of recurring transactions transferred from the first account to the second account.

Clause 19. The method of clause 11 or any embodiment of the present disclosure, further comprising:

transferring, by the at least one computing processor, the balance from the first account to the second account.

Clause 20. A computer-implemented method comprising:
receiving, by at least one computing processor, a request from a user to transfer a balance from a first account of a first financial institution to a second account of a second financial institution;
generating, by the at least one computing processor, a first user interface that enables the user to provide a plurality of statements associated with the first account and account credentials associated with the first account;
determining, by the at least one computing processor and using the plurality of statements or the account information, at least one recurring transaction among a plurality of transactions of the first account;
generating, by the at least one computing processor, a second user interface that enables the user to submit merchant-related credentials associated with the at least one recurring transaction, and provides a link to a landing page associated with the at least one recurring transaction; and
wherein the method further comprises:
transferring, by the at least one computing processor and using the merchant-related credentials, the at least one recurring transaction from the first account to the second account, or redirecting, by the at least one computing processor, the user to the landing page at which the user can login to transfer the at least one recurring transaction from the first account to the second account.

Clause 21. Embodiments herein may also take the form of a system comprised of computing elements that are arranged, coupled, configured, programmed and/or otherwise adapted to perform the features and functionality set forth anywhere in the present disclosure.

Clause 22. In addition, embodiments herein may also take the form of one or more computer readable media containing computer-executable instructions for performing any of the processing herein, the computer-executable instructions being executable via one or more processing components to process instructions regarding and/or otherwise perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
receiving, by at least one computing processor, a request from a user to transfer recurring charges from a first account of a first financial institution to a second account of a second financial institution;
generating, by the at least one computing processor, a first user interface that enables the user to provide account information associated with first account, wherein the first user interface has GUI elements for providing the plurality of statements consisting of (i) a first field that displays GUI tools to upload a plurality of statements associated with the first account both by providing a window into which files are dragged and dropped and by providing a button that searches directories on a computer of the user and enables selection of one or more statements to upload, and (ii) a second field that that consists of a display of two GUI fields into which the user enters account credentials associated with the first account and a GUI button that, when selected, proceeds with accessing the first account and determining recurring charges occurring in the first account, wherein the two GUI fields consist of a first field to enter the user's username and a second field to enter the user's password of the first account;
determining, by the at least one computing processor and using the account information, at least one recurring charge of the recurring charges occurring in the first account, the determining process comprising:
    accessing, by the at least one computing processor, information about a plurality of charges of the first account using the account credentials,
    performing automated computerized processing, including implementation of a machine learning process using a Naïve Bayes classification algorithm executed by the at least one computer processor that analyzes charges being debited to the first account to identify recurrence relationships regarding the charges being debited, and
    determining the at least one recurring charge and at least one merchant associated with each of the at least one recurring charge based on the recurrence relationships identified via the Naïve Bayes algorithm regarding the plurality of charges;
generating, by the at least one computing processor, a second user interface, displayed after the first user interface, to display the at least one recurring charge, wherein the second user interface is configured to:
    (i) display to the user, via a first display field, the at least one recurring charge, wherein the first display field consists of: a listing of the at least one recurring charge identified based on the recurrence relationships, the at least one merchant associated with each of the at least one recurring charge identified based on the recurrence relationships, date(s) that the at least one recurring charge occurred, and embedded links that enable the user to click a link to immediately navigate to a login page of each respective merchant associated with each of the at last one recurring charge; and
    (ii) display to the user, via a second display field including one or more entry fields, wherein the one or more entry fields each include two fields that prompt the user to submit merchant-related credentials consisting of a username and a password associated with each one of the at least one recurring charge;
transferring, by the at least one computing processor and using the merchant-related credentials, from the first account to the second account, every one of the at least one recurring charge transferred via the first display field and the second display field, wherein the transferring includes:
    accessing, by the at least one computing processor, an account of a merchant associated with the at least one recurring charge using the merchant-related credentials; and
    instructing, by the at least one computing processor and using the merchant-related credentials, a merchant associated with the at least one recurring charge to charge in the future the at least one recurring charge to the second account;

transferring, by the at least one computing processor, a balance from the first account to the second account;

displaying, by the at least one computing processor, a transfer status of at least one recurring charge; and providing, by the at least one computing processor, a listing of recurring charges transferred from the first account to the second account.

2. The method of claim 1, wherein determining the at least one recurring charge is based on the plurality of statements.

3. The method of claim 2, wherein the account credentials associated with the first account include a username and password for the first account.

4. The method of claim 1, wherein the account credentials associated with the first account include a username and password for the first account.

5. A computer-implemented method comprising:

receiving, by at least one computing processor, a request from a user to transfer a balance from a first account of a first financial institution to a second account of a second financial institution;

generating, by the at least one computing processor, a first user interface that enables the user to provide account information associated with first account, wherein the first user interface has GUI elements for providing the plurality of statements consisting of (i) a first field that displays GUI tools to upload a plurality of statements associated with the first account both by providing a window into which files are dragged and dropped and by providing a button that searches directories on a computer of the user and enables selection of one or more statements to upload, and (ii) a second field that consists of a display of two GUI fields into which the user enters account credentials associated with the first account and a GUI button that, when selected, proceeds with accessing the first account and determining recurring transactions occurring in the first account, wherein the two GUI fields consist of a first field to enter the user's username and a second field to enter the user's password of the first account;

determining, by the at least one computing processor and using the account information, at least one recurring transaction of the recurring transaction occurring in the first account, the determining process comprising:

accessing, by the at least one computing processor, information about a plurality of transactions of the first account using the account credentials, performing automated computerized processing, including implementation of a machine learning process using a Naïve Bayes classification algorithm executed by the at least one computer processor, that analyzes transactions associated with the first account to identify recurrence relationships regarding the transactions being processed, and determining the at least one recurring transaction and at least one merchant associated with each of the at least one recurring transaction based on the recurrence relationships identified via the Naïve Bayes classification algorithm regarding the plurality of transactions;

generating, by the at least one computing processor, a second user interface, which is displayed after the first user interface, to display the at least one recurring transaction, wherein the second user interface is configured to:

(i) display to the user, via a first display field, the at least one recurring transaction, wherein the first display field consists of: a listing of the at least one recurring transaction identified based on the recurrence relationships, the at least one merchant associated with each of the at least one recurring transaction identified based on the recurrence relationships, date(s) that the at least one recurring transaction occurred, and embedded links that enable the user to click a link to immediately navigate to a login page of each respective merchant associated with each of the at last one recurring transaction, to thereby (a) enable the user to submit merchant-related credentials associated with the at least one recurring transaction, and (b) provide a link to a landing page associated with the at least one recurring transaction; and (ii) display to the user, via a second display field including one or more entry fields, wherein the one or more entry fields each include two fields that prompt the user to submit merchant-related credentials consisting of a username and a password associated with each one of the at least one recurring transaction;

wherein the method further comprises:

transferring, by the at least one computing processor and using the merchant-related credentials, the at least one recurring transaction from the first account to the second account, or redirecting, by the at least one computing processor, the user to the landing page at which the user can login to transfer the at least one recurring transaction from the first account to the second account, by which every one of the at least one recurring transaction transferred via the first display field and the second display field are transferred, wherein the transferring includes:

accessing, by the at least one computing processor, an account of a merchant associated with the at least one recurring transaction using the merchant-related credentials;

determining the at least one recurring transaction based on the information about the plurality of transactions; and instructing, by the at least one computing processor and using the merchant-related credentials, a merchant associated with the at least one recurring transaction to occur in the future the at least one recurring transaction to the second account;

transferring, by the at least one computing processor, a balance from the first account to the second account;

displaying, by the at least one computing processor, a transfer status of the at least one recurring transaction; and providing, by the at least one computing processor, a listing of recurring transactions transferred from the first account to the second account.

6. The method of claim 5, wherein determining the at least one recurring transaction is based on the plurality of statements.

7. The method of claim 6, wherein the merchant-related credentials associated with the at least one recurring transaction include a username and password for an account of a merchant associated with the at least one recurring transaction.

8. The method of claim 5, wherein the merchant-related credentials associated with the at least one recurring transaction include a username and password for an account of a merchant associated with the at least one recurring transaction.

9. A computer-implemented method comprising:
receiving, by at least one computing processor, a request from a user to transfer a balance from a first account of a first financial institution to a second account of a second financial institution;
generating, by the at least one computing processor, a first user interface that enables the user to provide a plurality of statements associated with the first account and account credentials associated with the first account, wherein the first user interface has GUI elements for providing the plurality of statements consisting of (i) a first field that displays GUI tools to upload a plurality of statements associated with the first account both by providing a window into which files are dragged and dropped and by providing a button that searches directories on a computer of the user and enables selection of one or more statements to upload, and (ii) a second field that consists of a display of two GUI fields into which the user enters account credentials associated with the first account and a GUI button that, when selected, proceeds with accessing the first account and determining recurring charges occurring in the first account, wherein the two GUI fields consist of a first field to enter the user's username and a second field to enter the user's password of the first account;
determining, by the at least one computing processor and using the plurality of statements or the account information, at least one recurring transaction among a plurality of transactions of the first account, the determining process comprising:
 accessing, by the at least one computing processor, information about a plurality of charges of the first account using the account credentials,
 performing automated computerized processing, including implementation of a machine learning process using a Naïve Bayes classification algorithm executed by the at least one computer processor, that analyzes charges being debited to the first account to identify recurrence relationships regarding the charges being debited, and
 determining the at least one recurring charge based on the recurrence relationships identified via the Naïve Bayes classification algorithm regarding the plurality of charges;
generating, by the at least one computing processor, a second user interface, which is displayed after the first user interface, to display the at least one recurring charge, wherein the second user interface is configured to:
 (i) display to the user, via a first display field, the at least one recurring charge, wherein the first display field consists of: a listing of the at least one recurring charge identified based on the recurrence relationships, the at least one merchant associated with each of the at least one recurring transaction identified based on the recurrence relationships, date(s) that the at least one recurring charge occurred, and embedded links that enable the user to click a link to immediately navigate to a login page of each respective merchant associated with each of the at last one recurring transaction, to thereby that enable the user to submit merchant-related credentials associated with the at least one recurring transaction, and provide a link to a landing page associated with the at least one recurring transaction; and
 (ii) display to the user, via a second display field including one or more entry fields, wherein the one or more entry fields each include two fields that prompt the user to submit merchant-related credentials consisting of a username and a password associated with each one of the at least one recurring charge;
wherein the method further comprises:
transferring, by the at least one computing processor and using the merchant-related credentials, the at least one recurring transaction from the first account to the second account, or redirecting, by the at least one computing processor, the user to the landing page at which the user can login to transfer the at least one recurring transaction from the first account to the second account, wherein the transferring includes:
 accessing, by the at least one computing processor, an account of a merchant associated with the at least one recurring charge using the merchant-related credentials;
 determining the at least one recurring transaction based on the information about the plurality of transactions; and
 instructing, by the at least one computing processor and using the merchant-related credentials, a merchant associated with the at least one recurring charge to charge in the future the at least one recurring charge to the second account;
transferring, by the at least one computing processor, a balance from the first account to the second account;
displaying, by the at least one computing processor, a transfer status of the at least one recurring charge; and
providing, by the at least one computing processor, a listing of recurring charges transferred from the first account to the second account.

10. The method of claim 9, wherein determining the at least one recurring transaction is based on the plurality of statements.

11. The method of claim 9, wherein the merchant-related credentials associated with the at least one recurring transaction include a username and password for an account of a merchant associated with the at least one recurring transaction.

12. The method of claim 11, wherein determining the at least one recurring transaction is based on the plurality of statements.

* * * * *